US012651474B2

(12) United States Patent
Mittal et al.

(10) Patent No.: US 12,651,474 B2
(45) Date of Patent: Jun. 9, 2026

(54) OPTICAL CHARACTER RECOGNITION FILTERING

(71) Applicant: Palo Alto Networks, Inc., Santa Clara, CA (US)

(72) Inventors: Anirudh Mittal, Fremont, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 349 days.

(21) Appl. No.: 17/821,247

(22) Filed: Aug. 22, 2022

(65) Prior Publication Data

US 2024/0062569 A1 Feb. 22, 2024

(51) Int. Cl.
*G06V 30/00* (2022.01)
*G06V 30/19* (2022.01)
(52) U.S. Cl.
CPC .. *G06V 30/19167* (2022.01); *G06V 30/19173* (2022.01)
(58) Field of Classification Search
CPC ....... G06V 30/19167; G06V 30/19173; G06V 30/10; G06V 30/413; G06V 30/147; G06V 10/82
See application file for complete search history.

(56) References Cited

U.S. PATENT DOCUMENTS 8,755,595 B1 * 6/2014 Bissacco ............... G06F 18/214
382/159
11,449,797 B1 * 9/2022 Kurniawan ............ G06N 20/00

2019/0019052 A1 * 1/2019 Pao ...................... G06V 30/413
2022/0067203 A1 * 3/2022 Pottier .................. G06N 20/00

FOREIGN PATENT DOCUMENTS

CN 112183523 A * 1/2021
CN 113762237 A * 12/2021

OTHER PUBLICATIONS

Wikipedia, Confusion matrix (Year: 2024).*
Wikipedia, Training, validation, and test data sets (Year: 2024).*
Google, Confusion matrix threshold in machine learning (Year: 2024).*
Wikipedia, image file format (Year: 2024).*
Umer et al, Deep features based convolutional neural network model for text and non-text region segmentation from document images, Applied Soft Computing 113 107917 (Year: 2021).*

* cited by examiner

*Primary Examiner* — Xiao Liu
(74) *Attorney, Agent, or Firm* — Gilliam IP PLLC

(57) ABSTRACT

An optical character recognition (OCR) filter described herein filters non-textual files in scanned customer data from OCR and pattern analysis of text generated thereof for sensitive customer data. The OCR filter is trained on files labelled using feature values for features generated from OCR applied to the corresponding files. Moreover, the OCR filter stores internal representations of the files during training to avoid leaking potential sensitive customer data contained therein. Once trained, performance of the OCR filter in filtering files comprising image data without text is evaluated according to false positive rates and false negative rates by comparing classifications of the OCR filter to classifications according to feature values for features generated from OCR. Evaluation of the OCR filter ensures continued model performance and informs model updates.

20 Claims, 7 Drawing Sheets

OPTICAL CHARACTER RECOGNITION FILTERING

BACKGROUND

The disclosure generally relates to data processing (e.g., CPC class G06F) and to clustering or classification (e.g., CPC subclass G06F 16/35).

Optical character recognition ("OCR") is a technique for detecting and annotating text in images. OCR involves numerous pre-processing, image detection, and post-processing steps. During pre-processing, OCR removes artifacts from images and normalizes the images for improved text detection. Image detection of text is translation, dilation, and rotation invariant to detect text of various sizes, displacements, and orientations. Text detection involves generating bounding boxes that contain text, normalizing the bounding boxes to have a standard size, and deploying a model that is trained to recognize characters within each bounding box. OCR can further annotate images with the detected text with annotations occurring at corresponding places within each image where the text was detected.

BRIEF DESCRIPTION OF THE DRAWINGS

Aspects of the disclosure may be better understood by referencing the accompanying drawings.

DESCRIPTION

Figure 1:
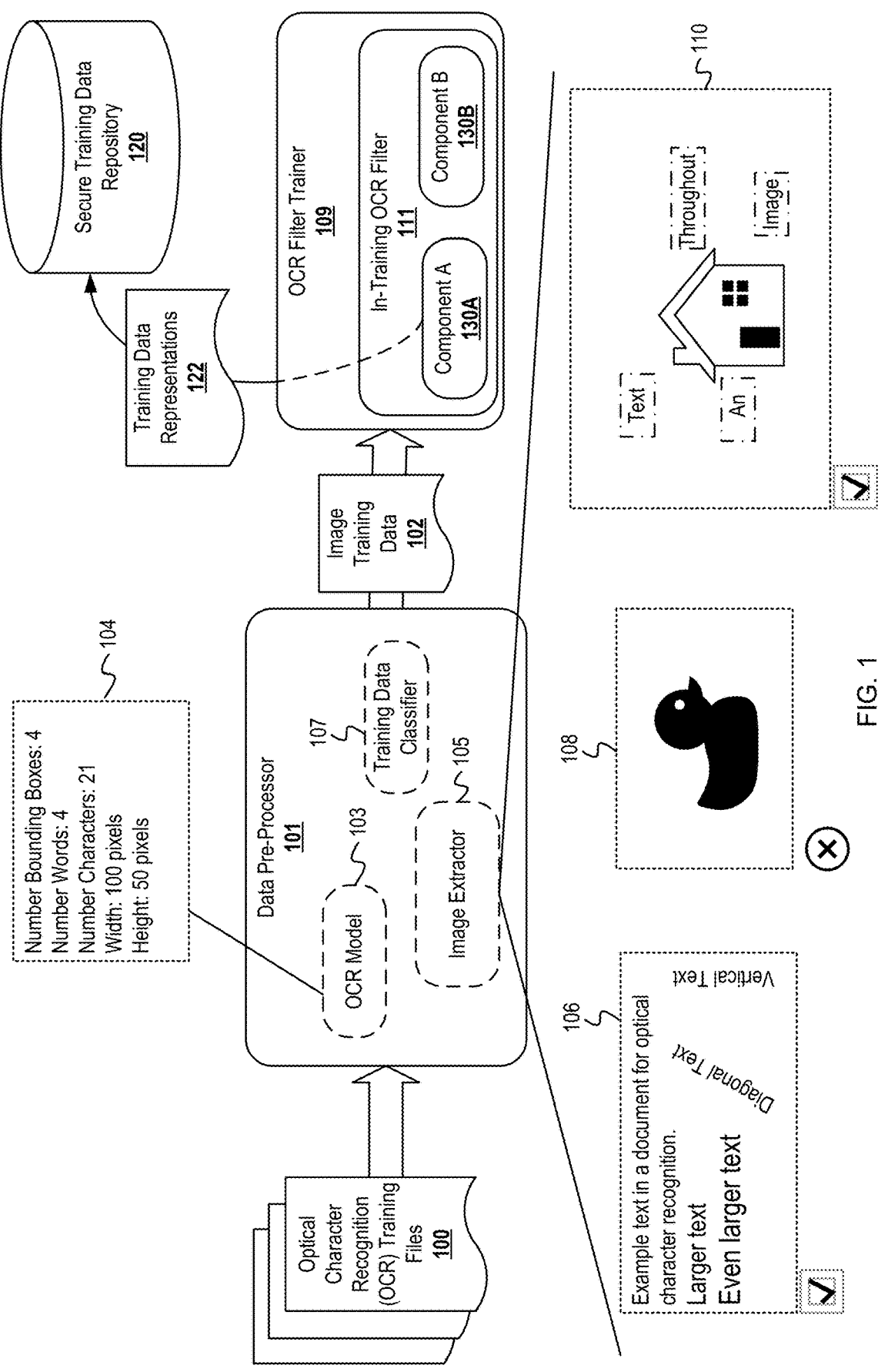
FIG. 1 is a schematic diagram of an example system for training an OCR filter for an OCR model.

The description that follows includes example systems, methods, techniques, and program flows that embody aspects of the disclosure. However, it is understood that this disclosure may be practiced without these specific details. For instance, this disclosure refers to filtering image files using a trained OCR filter to reduce instances of running OCR on image files without text in illustrative examples. Aspects of this disclosure can be instead applied to filtering images for other types of image detection, for instance filtering images for object detection that do not contain certain types of objects. In other instances, well-known instruction instances, protocols, structures and techniques have not been shown in detail in order not to obfuscate the description.

Overview

Deployed OCR systems suffer from high computational loads in environments where large amounts of image data are processed for character recognition, especially when a significant subset of the image data does not contain characters. Due to the extensive pre-processing, text recognition, and post-processing pipeline for OCR, applying OCR to images without text is vastly inefficient. The present disclosure relates to filtering images prior to OCR to reduce frequency of inefficient computations on images without text. Moreover, potentially sensitive client data is securely stored during training using representations of images output from internal layers of an OCR filter. Secure storage of potentially sensitive client data reduces/prevents data loss and leakage in the form of text rendered from image data.

The OCR filter is trained on labelled files comprising image data to classify files as containing or not containing text. Labels for files in the training data are generated using features computed during OCR such as number of bounding boxes, number of words, and number of characters. A "text" or positive (1) label corresponds to these features being above corresponding thresholds for an image containing text and a "no text" or negative (0) label corresponding to at least one of these features being below the corresponding threshold. The OCR filter is a convolutional neural network (CNN) or other image classification model trained on the labelled training data to detect when images contain text and when to use OCR. To avoid storing customer image data during training that comprises potentially sensitive information, representations of the training files output by an internal layer of the CNN or first input component for the OCR filter are stored. Training of the OCR filter thus occurs separately for the first component and a second component that generates file classifications from the training file representations. The last layers of the CCN are then trained on the stored representations and corresponding labels generated using OCR.

Subsequently, once the OCR filter is deployed, an evaluator tracks false positive rate (FPR) and false negative rate (FNR) of the OCR filter. The evaluator intercepts a subset of customer files as they are processed by the OCR filter (e.g., 10% chosen uniformly at random) and processes the intercepted customer image data using OCR to determine whether the image data contains text according to features generated by OCR as described previously. The evaluator then verifies the percentage of incorrectly filtered data against correctly filtered data (false positives) and percentage of incorrectly unfiltered data against correctly unfiltered data (false negatives). The evaluator can then track performance of the OCR filter both in terms of computational efficiency and filtering accuracy and can update and/or recall the OCR filter from deployment depending on performance to maintain overall quality and speed for text recognition.

Example Illustrations

FIG. 1 is a schematic diagram of an example system for training an OCR filter for an OCR model. A data pre-processor 101 receives OCR training files 100 and uses them to generate image training data 102 using an OCR model 103, an image extractor 105, and a training data classifier 107. An OCR filter trainer 109 receives the image training data 102 and uses it to train an in-training OCR filter 111. During training, the in-training OCR filter 111 generates training data representations 122 output by internal layers of the in-training OCR filter 111 that are stored in a secure training data repository 120 during training.

The data pre-processor 101 intakes the OCR training files 100 and the image extractor 105 processes the OCR training files 100 according to corresponding image file formats to generate image data corresponding to images such as example images 106, 108, and 110. The OCR training files 100 can be stored in a file format such as JPEG, Portable Network Graphics (PNG), Portable File Format (PDF), etc. The image extractor 105 can comprise one or more off-the-shelf and/or native components configured to handle various image formats and convert them into image data (e.g., pixel color values in a matrix with number of rows/columns corresponding to pixel width/pixel height of the corresponding image, respectively). The image extractor 105 can read and handle images with separate image processing components (e.g., off-the-shelf image processors) corresponding to each format using filename extensions such as ".jpg", ".pdf", ".png", etc. The example images 106, 108, and 110 depict, respectively, text of various orientations and sizes, a duck, and text surrounding a house. Note that while these example images 106, 108, and 110 are depicted in FIG. 1 for the purposes of illustration, the data pre-processor 101 will neither store nor present these images to a graphical user interface (GUI) so as to protect potentially sensitive text data in images that would be displayed during rendering.

The OCR model 103 receives data for images extracted by the image extractor 105 and generates text-based features from the extracted images. Example text-based features 104 comprise a number of bounding boxes equal to 4, a number of words equal to 4, a number of characters equal to 21, a pixel width of 100, and a pixel height of 50. Note that these text-based features correspond to example image 110 having the text "text", "throughout", "an", and "image" in separate bounding boxes. Example image 110 is depicted with bounding boxes in alternating dashed/dotted lines computed by the OCR model 103 during feature generation. While these dashed/dotted lines are depicted in FIG. 1 for illustrative purposes, during implementation of the data pre-processor 101 these bounding boxes are represented as ranges of pixel values in memory and are neither rendered nor stored subsequent to feature generation. The OCR model 103 can perform pre-processing and text recognition operations until it generates related features and can omit subsequent OCR operations such as text annotation to reduce computational steps.

The training data classifier 107 receives image data feature values from the OCR model 103 and uses them to generate labels for the image data extracted by the image extractor 105. The training data classifier 107 can verify that the number of bounding boxes, number of words, number of characters, pixel width, and pixel height of extracted images are above respective thresholds (e.g., 20 pixels) for images to contain text data. The training data classifier 107 then assigns a "text" or 1 label to files in the OCR training files 100 having respective feature values above the corresponding thresholds and can otherwise assign training files a label of "no text" or 0. Note that the example images 106 and 110 satisfying the respective thresholds for number of bounding boxes, number of words, and number of characters and are assigned a "text" or 1 label (as indicated by the check marked boxes depicted in FIG. 1), whereas the example image 108 is assigned a "no text" or 0 label (as indicated by the x marked box depicted in FIG. 1) because it comprises an image of a duck without text and these features have value 0. The data pre-processor 101 combines files in the OCR training files 100 with corresponding labels generated by the training data classifier 107 and adds them as file/label pairs to image training data 102 that the data pre-processor 101 communicates to the OCR filter trainer 109. In some embodiments, the image training data 102 comprises the original files in the OCR training files 100 and the in-training OCR filter 111 comprises a data processing component that extracts image data according to file formats. In other embodiments the image training data 102 comprises image data extracted therefrom and the corresponding labels and the in-training OCR filter 111 classifies the extracted image data directly.

The OCR filter trainer 109 uses the image training data 102 to train the in-training OCR filter 111 to predict images extracted from files that comprise text. For instance, the in-training OCR filter 111 can comprise a CNN and the OCR filter trainer 109 can train the in-training OCR filter 111 in batches and epochs across batches via backpropagation according to a loss function for the CNN. In particular, the OCR filter trainer 109 can split the image training data 102 into training, testing, and validation set and can input batches of training data into the in-training OCR filter 111.

During a first epoch in training (i.e., an iteration through the training set), the in-training OCR filter 111 computes training data representations 122 that it communicates to a secure training data repository 120. These training data representations 122 comprise outputs of an internal component of the in-training OCR filter 111 prior to final outputs that classify images as "text"/1 or "no text"/0. During a first pass through training data in the image training data 102, the in-training OCR filter 111 generates these internal representations. Thus, the OCR training files 100 are processed by the data pre-processor 101 and then the image training data 102 generated therefrom is used by the in-training OCR filter 111 and discarded after the training data representations 122 are generated at the first pass. This avoids storage of the OCR training files 100 or representations thereof which contain potentially sensitive data.

When generating the training data representations 122, the in-training OCR filter 111 comprises two components—component A 130A and component B 130B. Component A 130A generates internal representations that are stored as the training data representations 122 that are stored in the secure training data repository 120, and component B 130B uses representations generated by component A 130A to classify images as containing text. In some embodiments, component A 130A is a pre-trained component such as, in the CNN example given above, a set of convolutional layers pre-trained on text image data. Thus, in these embodiments during training, the OCR filter trainer 109 trains component B 130B on the training data representations 122 (note that the original image data used to train component A 130A has been discarded to protect sensitive client data). An example of components 130A and 130B is depicted in greater detail for a CNN in FIG. 3.

The OCR filter trainer 109 then begins inputting representations in the training data representations 122 into the component B 130B in batches. After each batch, the OCR filter trainer 109 can determine the loss for that batch (according to the loss function for the CNN) and can backpropagate the loss function using gradient descent to update internal weights of the CNN. This process can occur across batches of training data and epochs until a training termination criterion is satisfied. For instance, the training termination criterion can comprise that a threshold number of batches and/or epochs has occurred, that the training and/or testing error is sufficiently low, that the training error converges across batches, etc. While described with reference to a CNN, in-training OCR filter 111 can comprise any model that classifies images according to labels and comprises two distinct sub-components (i.e., component A 130A and component B 130B).

Figure 2:
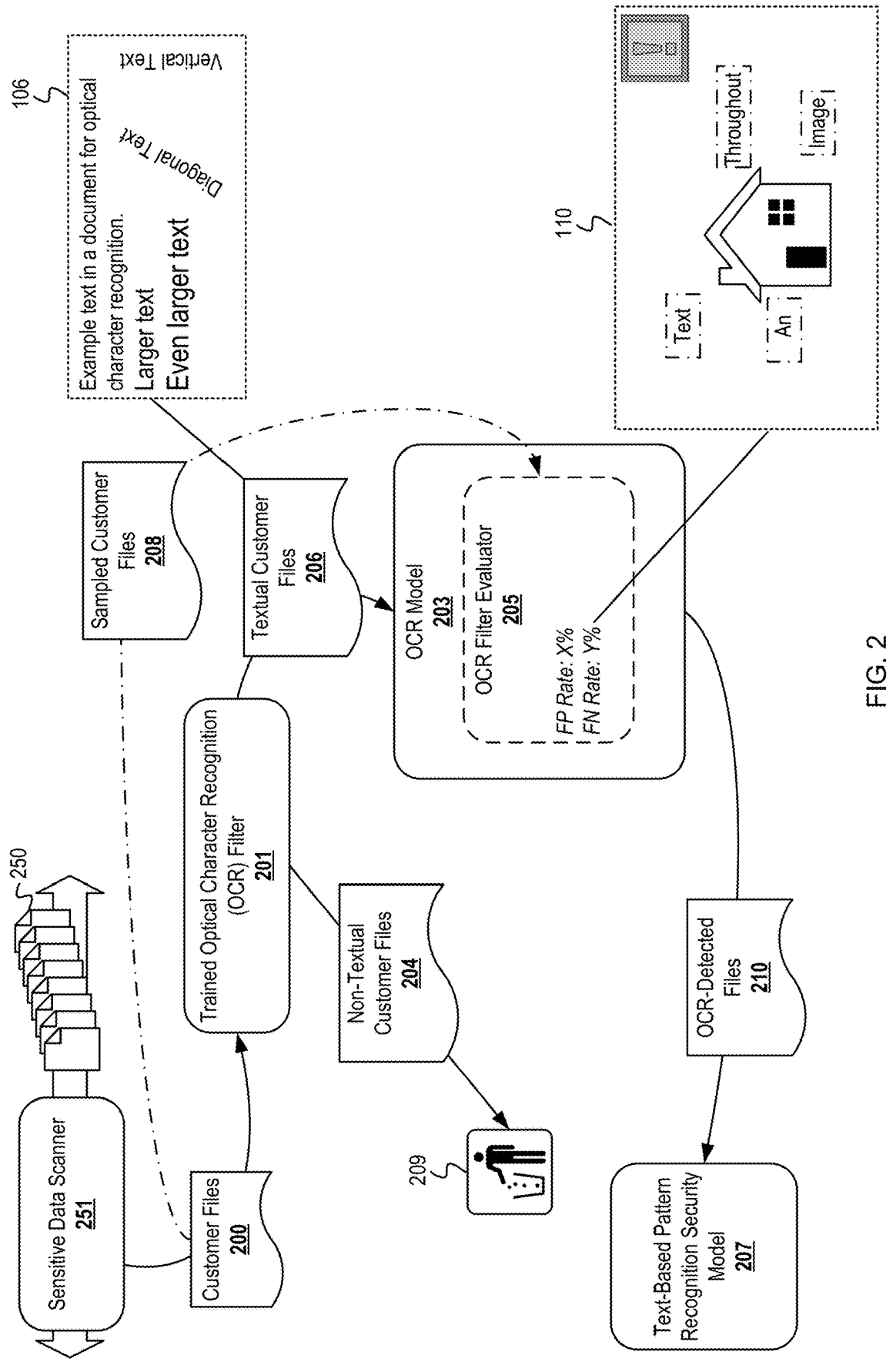
FIG. 2 is a schematic diagram of an example system for filtering customer data for OCR.

FIG. 2 is a schematic diagram of an example system for filtering customer data for OCR. A trained OCR filter 201 receives customer files 200 from a sensitive data scanner 251 and filters the customer files 200 into textual customer files 206 and non-textual customer files 204, that latter of which the trained OCR filter 201 discards. An OCR model 203 receives the textual customer files 206 and generates OCR-detected files 210 that the OCR model 203 communicates to a text-based pattern recognition security model 207 (hereafter "pattern model 207"). An OCR filter evaluator 205 receives sampled customer files 208 sampled from the customer files 200 and uses the sampled customer files 208 in tandem with classifications by the trained OCR filter 201 to determine false positive (FP) and false negative (FN) detection rates of textual customer data. The OCR filter evaluator 205 periodically evaluates performance of the trained OCR filter 201 according to FP and FN detection rates to determine whether to retrain the trained OCR filter 201 and to evaluate increase in computational efficiency due to filtering operations as well as approximate loss rate of customer files 200 comprising text that are discarded.

The sensitive data scanner 251 can monitor data streams across physical networks, virtual networks, Internet of Things (IoT) devices, Software as a Services (SaaS) applications, etc. Each data stream comprises potentially sensitive customer data such as files 250. The sensitive data scanner 251 can be running in the cloud and can collect data across secure connections from various sources including agents at endpoint devices. In other embodiments, the sensitive data scanner 251 is running on an endpoint device and monitoring communications to and from the endpoint device for potentially sensitive information. The potentially sensitive information can comprise compressed and otherwise formatted image files that can contain text revealing sensitive data (e.g., client information). The sensitive data scanner 251 determines which of the files 250 comprise image data and adds them to the customer files 200. The sensitive data scanner 251 can operate inline and can continuously communicate the customer files 200 to the trained OCR filter 201 to detect potential data loss as soon as it occurs. The sensitive data scanner 251 can additionally monitor files/data in storage and can, in response to determining that the files/data are sensitive, escalate required privileges for data access.

The customer files 200 comprise images encoded in various file formats such as JPEG, PDF, PNG, etc. The trained OCR filter 201 comprises various pre-processing components including a component that extracts images according to various file formats (for instance, as indicated in filename extensions in the customer files 200). In other embodiments, the sensitive data scanner 251 comprises a data processing component that extracts images to include in the customer files 200 according to various file formats. The trained OCR filter 201 then classifies extracted image data as containing text or not containing text. The trained OCR filter 201 discards the non-textual customer files 204 in a trash bin 209. The trash bin 209 is depicted as a system component in FIG. 2 for illustrative purpose and, in some embodiments, the trained OCR filter 201 deletes the non-textual customer files 204 from memory. The trained OCR filter 201 can additionally communicate an indication to the pattern model 207 that the non-textual customer files 204 does not contain text, e.g., via a notification that comprises metadata associated with the non-textual customer files 204 such as file paths for files in the non-textual customer files 204 that are extracted as image data by the trained OCR filter 201. The trained OCR filter 201 additionally adds data in the customer files 200 classified as containing text to the textual customer files 206. Example image 106 depicts an example image rendered from a file in the textual customer files 206 containing text of various sizes and orientations. The trained OCR filter 201 is trained to detect text of varying sizes and orientations and can have model architecture that is conducive to translation, dilation, and rotation invariant image detection such as, for instance, CNN architecture. The trained OCR filter 201 communicates the textual customer files 206 to the OCR model 203.

The OCR model 203 applies OCR to the textual customer files 206 to generate the OCR-detected files 210. The OCR-detected files 210 comprise text detected in image data extracted from the textual customer files 206 by the OCR model 203. For instance, the OCR-detected files 210 can be plaintext comprising American Standard Code for Information Interchange (ASCII) characters. In some embodiments, the OCR-detected files 210 can further comprise metadata such as alignment, font size, and/or font of text in image data corresponding to the ASCII characters. The OCR model 203 can further render images corresponding to image data in the textual customer files 206 and can annotate the rendered images with the detected text. Alternatively, the OCR model 203 can include metadata that describes placement and/or orientation of annotations within rendered images in the OCR-detected files 210 and the pattern model 207 can render images and add annotations included therein.

The pattern model 207 receives the OCR-detected files 210 and analyzes any plaintext/text data included therein for patterns that indicate potentially sensitive data. The pattern model 207 stores data patterns that describe sensitive content including regular expressions and proximity keywords. For instance, a regular expression can specify a 16-digit string of integers followed by an identifier (from a list of identifiers) of a credit card company. A corresponding proximity keyword can be the name of the credit card company. Proximity keywords can be weighted according to string distances (e.g., Levenshtein distance) when detecting sensitive data. Additionally, regular expressions can be configured to assign scores rather than matches for strings, and strings with scores exceeding a threshold score can correspond to matches. When the pattern model 207 detects sensitive data in the OCR-detected files 210, the pattern model 207 can communicate indications of the data being sensitive (along with any corresponding metrics such as regular expression scores) as well as identifiers for the customer data (e.g., filenames and extensions).

In parallel to the trained OCR filter 201 filtering customer files 200 and the OCR model 203 detecting text in the textual customer files 206 filtered as having text, the OCR filter evaluator 205 evaluates quality of the trained OCR filter 201 using metrics such as FPR and FNR. Operations of the OCR filter evaluator 205 are depicted with alternating dotted/dashed lines to indicate that these operations can be performed independently of and parallel to operations for components with solid lines depicted in FIG. 2. The OCR filter evaluator 205 samples the customer files 200 as sampled customer files 208 and applies the OCR model 203 to evaluate corresponding classifications performed by the trained OCR filter 201. The OCR filter evaluator 205 samples the customer files 200 at a frequency that depends on operational considerations such as volume of the customer files 200 and efficiency of the OCR model 203. When there is a high volume of the customer files 200, the OCR model 203 is inefficient, etc., the OCR filter evaluator 205 can sample at a low rate (e.g., 0.01%), whereas when operational costs are lower, there is greater available computational resources, etc., the OCR filter evaluator 205 can sample at a high rate (e.g., 10%). The OCR filter evaluator 205 can be automatically (e.g., according to a schedule for how recently the trained OCR filter 201 was last evaluated) or manually triggered to start and stop subsampling.

The OCR model 203 generates classifications that indicate whether the sampled customer files 208 contain text that the OCR filter evaluator 205 compares to corresponding classifications by the trained OCR filter 201. In some embodiments, the OCR model 203 generates features such as number of bounding boxes, number of words, and number of characters to which the OCR filter evaluator 205 applies criteria to determine whether text is present. For instance, the OCR filter evaluator 205 can apply the criteria used for generating training data as described previously with reference to FIG. 1.

Once the OCR filter evaluator 205 determines classifications of the sampled customer files 208, the OCR filter evaluator 205 determines the FPR as the ratio of the number of false positives (i.e., image data classified as textual by the trained OCR filter 201 and classified as non-textual by the OCR model 203) to the number of true negatives (i.e., image data classified as non-textual by the OCR model 203 or features generated thereof). Similarly, the FNR is the ratio of the number of false negatives to the number of true positives. Note that the FNR is an important metric for the purposes of evaluating the trained OCR filter 201 because it determines the amount of image data extracted from the customer files 200 that is not received by the OCR model 203 and still contains text. The example image 110 comprises an image that was incorrectly classified as non-textual by the trained OCR filter 201 (and, thus, increases the FNR for the trained OCR filter 201). The trained OCR filter 201 can incorrectly classify the example image 110 due to, for instance, sparsity of the four words interspersed throughout a depiction of a house resulting in a low number of bounding boxes.

Based on the FPR and FNR of the trained OCR filter 201 on the sampled customer files 208, the OCR filter evaluator 205 can determine whether to update the trained OCR filter 201 or continue deployment. For instance, the OCR filter evaluator 205 can determine that one of the FPR and FNR are above corresponding thresholds and can indicate the trained OCR filter 201 for retraining. In addition or alternatively, the OCR filter evaluator 205 can indicate updated model architecture, model type, etc. for the trained OCR filter 201. For instance, a model architecture and/or type can be indicated for model updates that are known to reduce one or both of FPR and FNR. The thresholds for FPR and FNR that determine whether to update the trained OCR filter 201 can depend on operational considerations such as volume of customer files 200, desired accuracy for OCR recognition, available computing resources for retraining and/or updating the trained OCR filter 201, etc. and can be determined during training. Other metrics for evaluating the trained OCR filter 201 can be used such as efficiency, filtering rate, etc.

Figure 3:
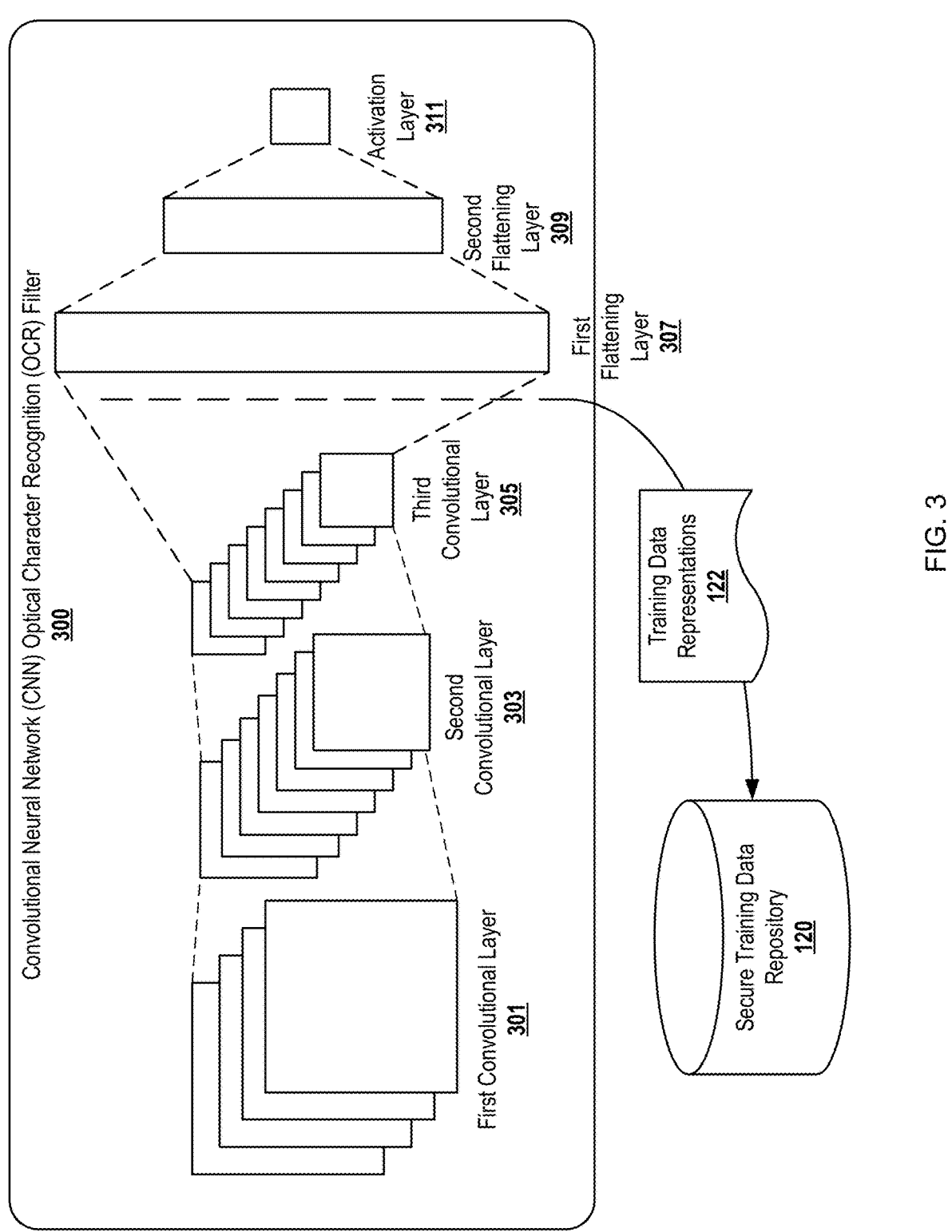
FIG. 3 is a schematic diagram of architecture for an example OCR filter.

FIG. 3 is a schematic diagram of architecture for an example OCR filter. The CNN OCR filter 300 comprises a first convolutional layer 301, a second convolutional layer 303, a third convolutional layer 305, a first flattening layer 307, a second flattening layer 309, and an activation layer 311. As the CNN OCR filter 300 receives image data corresponding to training files in a first training epoch (i.e., a first pass through the training data), the CNN OCR filter 300 communicates the training data representations 122 output by the third convolution layer 305 to the secure training data repository 120. The training data representations 122 comprise masked representations of image data output by an internal layer of the CNN OCR filter 300 that are difficult to reverse engineer (i.e., to determine original input image data) due to non-linearity of internal layers and unknown internal weights at each layer. This ensures the secure training data repository 120 comprises masked representations of customer data that are secure during training.

In some embodiments, the convolutional layers 301, 303, and 305 are pretrained on image data including text image data (e.g., non-sensitive image data) to generate representations of images that can be accurately classified by flattening layers 307 and 309 and activation layer 311. Additionally, in these embodiments, the convolutional layers 301, 303, and 305 can have internal weights that are fixed during training and backpropagation to update internal weights can be applied to only the remaining layers.

The representation of the CNN OCR filter 300 as a CNN comprising convolutional, flattening, and activation layers in the depicted arrangement is an example for illustrative purposes. Other neural network architectures that comprise additional layers, alternative layers such as max pooling layers, and rearrangements of the depicted layers can be used. The choice of internal layers that output the training data representations 122 can vary. In some embodiments, machine learning models other than neural networks are implemented for OCR filtering. These models can be subdivided according to model type into a first component that generates internal representations of image data and a second component that generates textual/non-textual classifications for the internal representations.

Figure 4:
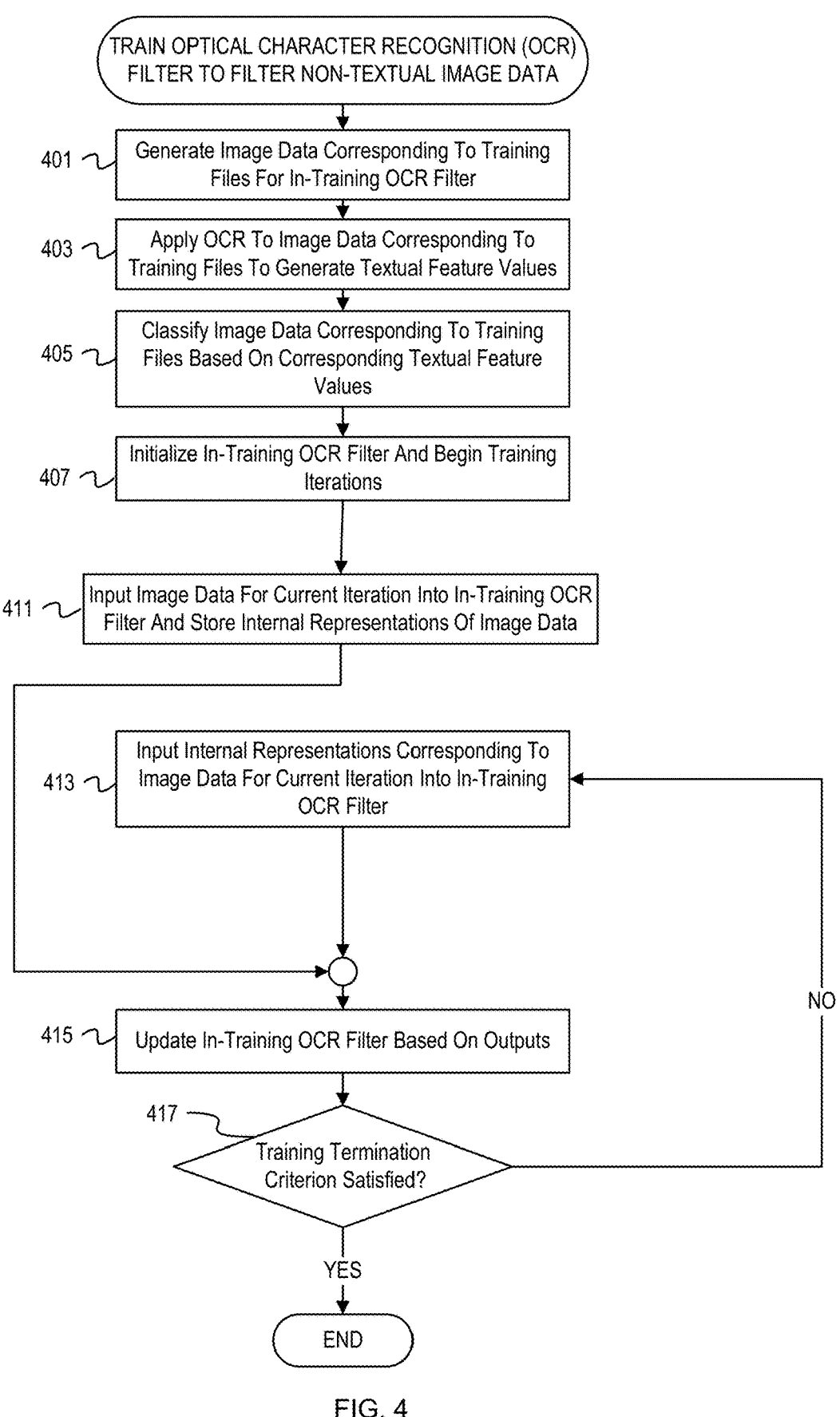
FIG. 4 is a flowchart of example operations for training an OCR filter to filter non-textual image data.
Figure 5:
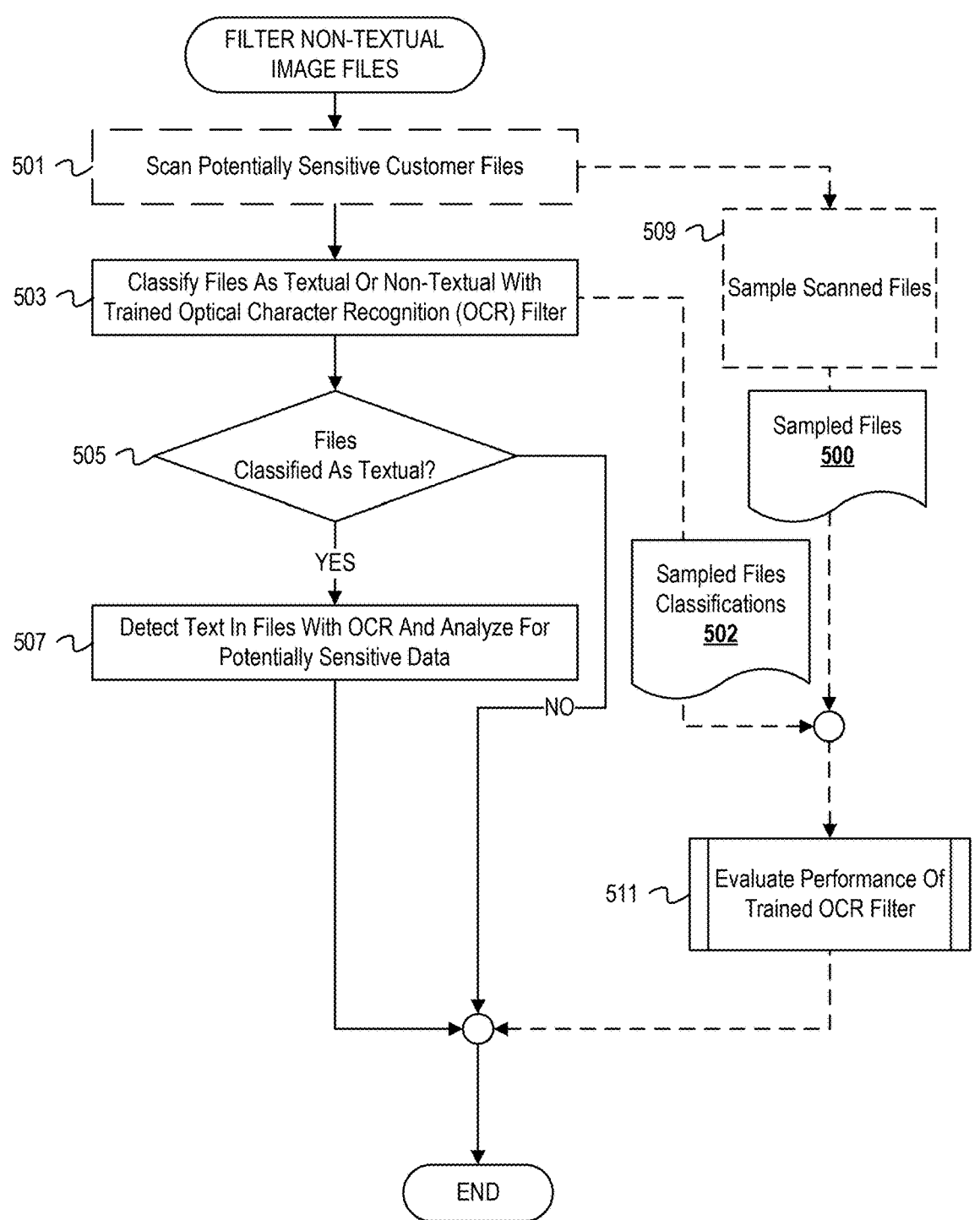
FIG. 5 is a flowchart of example operations for filtering non-textual image files.
Figure 6:
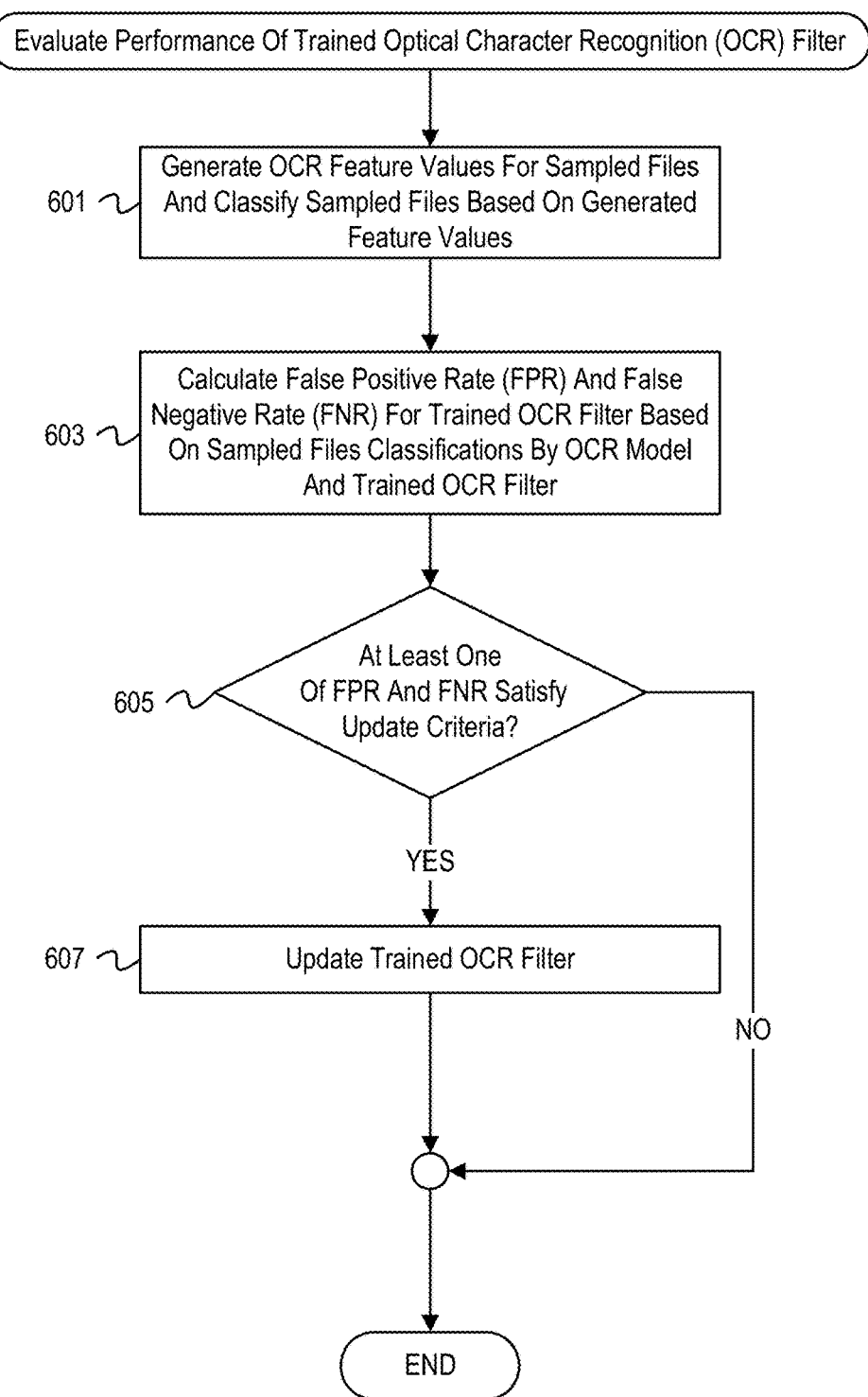
FIG. 6 is a flowchart of example operations for evaluating performance of a trained OCR filter.

FIGS. 4-6 are flowcharts of example operations for training, deploying, and evaluating OCR filters. The example operations are described with reference to a data pre-processor, an in-training OCR filter, a trained OCR filter, an OCR filter trainer, a sensitive data scanner, an OCR filter evaluator, and a text-based pattern recognition security model for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for training an OCR filter to filter non-textual image data. At block 401, a data pre-processor generates image data corresponding to training files for an in-training OCR filter. The data pre-processor can convert multiple file types (e.g., as indicated in filename extensions of the training files) into image data. The data pre-processor can comprise multiple subcomponents including, in some embodiments, third party software configured to convert corresponding file types into image data. The image data comprises color values (e.g., a RGB color model hexadecimal code) at each pixel of the corresponding image. Depending on the file type, the training files can comprise file formats that implement lossy compression image data, such that when the data pre-processor generates corresponding image data, the image data is an approximation of the original image that can contain artifacts. The data pre-processor can apply smoothing techniques to reduce artifacts and/or other image processing techniques that improve quality of lossy compressed images.

At block 403, an OCR model applies OCR to the image data corresponding to training files to generate textual feature values. The textual features can comprise a number of bounding boxes, a number of characters, a number of words, an average number of words per bounding box, an average number of characters per bounding box, a pixel height, a pixel width, etc. The OCR model can perform various pre-processing and text recognition steps to generate the textual feature values.

At block 405, the data pre-processor classifies the image data corresponding to the training files based on the corresponding textual feature values. The data pre-processor can determine whether each of the feature values are above respective thresholds. For instance, the data pre-processor can determine that the image data is at least size 10×10 pixels, that there is at least 1 bounding box, that there are at least 2 words, and that there are at least 10 characters. These thresholds can depend on context for the image data being potentially sensitive. For instance, image data with less than 10 characters will have a very low likelihood of containing sensitive data because sensitive data requires at least 10 characters (e.g., credit card numbers, names with associated personal information, business accounts and passwords, etc.). The data pre-processor can require that all of the thresholds be satisfied, that subsets of the thresholds be satisfied (e.g., one of word/character thresholds is satisfied), that a certain number of thresholds are satisfied, etc. The criteria for image classification can additionally depend on the types of features generated by the OCR model.

At block 407, an OCR filter trainer ("trainer") initializes the in-training OCR filter. For instance, when the in-training OCR filter is a CNN, then the OCR filter trainer initializes internal weights for the in-training OCR filter that can be randomized/normalized according to its architecture. The in-training OCR filter comprises two components—a first component that generates internal representations of image data for secure storage during training and a second component that classifies the internal representations as textual or non-textual. In some embodiments, the in-training OCR filter initializes the second component whereas the first component is pre-trained and does not require initialization.

The example operations depicted in blocks 411, 413, 415, and 417 correspond to training of the in-training OCR filter. Training proceeds in several epochs (i.e., passes through the entire set of training data) using image data for the training files and corresponding classifications. Each training iteration proceeds depending on the type of model for the in-training OCR filter. When the in-training OCR filter is a CNN or other type of neural network, each iteration occurs for a batch of training data that can be sampled from the image data corresponding to training files uniformly at random.

At block 411, the trainer inputs image data for the current (first) iteration into the in-training OCR filter and stores internal representations of the image data. Format of the internal representations can depend on the type of in-training OCR filter. For instance, when the in-training OCR filter is a neural network, then the internal representations can be outputs from an internal layer of the neural network. In these embodiments, layers of the neural network prior to the internal layer that outputs representations of the image data can be pretrained (e.g., on non-sensitive image data) and fixed during training. For different types of in-training OCR filters, the internal representations can be generated by a first component that feeds into a second component that makes classifications. The original training image data is difficult to reverse engineer from the stored internal representations due to lack of knowledge of the internal architecture and internal weights/parameters of the in-training OCR filter by a malicious entity. Flow proceeds to block 415.

At block 415, the trainer updates the in-training OCR filter based on outputs corresponding to inputs at the current iteration. For instance, for a neural network in-training OCR filter the trainer can update internal weights at internal layers of the neural network using backpropagation according to a loss function. This loss function is computed using a comparison of textual/non-textual classifications by the in-training OCR filter and labels for the corresponding image data in the training set. The in-training OCR filter comprises two distinct components, a first component that generates internal representations and a second component that generates textual/non-textual classifications based on the internal representations, the trainer can only update the second component.

At block 417, the trainer determines whether a training termination criterion is satisfied. The training termination criterion can vary and depends on the type of in-training OCR filter. For instance, the training criterion for a neural network can be that a threshold number of epochs and/or iterations have elapsed, that training, testing, and validation error is sufficiently small, that internal weights of the neural network converge across iterations, etc. If the training termination criterion is satisfied, the operations in FIG. 4 are complete. Otherwise, flow proceeds to block 413.

At block 413, the trainer inputs internal representations corresponding to image data for the current iteration into the in-training OCR filter. The internal representations were generated by a component of the in-training OCR filter during a previous iteration in the first epoch through the training data. The trainer can, for instance, query a database for the internal representations of the training data for the current iteration. The internal representations can be stored in local or random-access memory for efficient retrieval. The trainer inputs the internal representations into a component of the in-training OCR filter that is distinct and sequential to the component that generated the internal representations. For a neural network, this is the internal layers immediately following the internal layer that output the internal representations. Flow proceeds to block 415.

FIG. 5 is a flowchart of example operations for filtering non-textual image files with a trained OCR filter. FIG. 5 is depicted with two flows that occur in parallel—a first flow that occurs at blocks 501, 503, 505, and 507, and a second flow (depicted with dashed line arrows) that occurs at blocks 501, 509, and 511. The second flow uses data generated by the first flow but occurs independently and functions to monitor operational performance of an OCR filter as the OCR filter filters non-textual files through the first flow.

At block 501, a sensitive data scanner ("scanner") scans potentially sensitive customer files. The files can comprise customer data being monitored for data loss prevention. For instance, the customer data can be monitored natively on an endpoint device, across the cloud as SaaS traffic, across a public cloud environment, across virtual machines running on a cloud, across a local area or wide area network, etc. The scanner can have a module that detects image data, for instance by searching for filename extensions from a list of filename extensions known to correspond to image data (.jpg, .pdf, .gif, .png, etc.). Block 501 is depicted with a dashed line (distinct from the dashed line corresponding to the second flow in FIG. 5) to indicate that the scanner continuously monitors customer data for data loss prevention and the remainder of operations in FIG. 5 are triggered whenever the scanner detects image data to be analyzed for textual information. Flow proceeds to block 503 along the first flow in FIG. 5 and to block 509 along the second flow in FIG. 5.

At block 503, a trained OCR filter ("filter") classifies the files as textual or non-textual. For instance, the filter can be a CNN with architecture designed to classify the files. The filter or a separate data processing component can process the files to extract image data according to the corresponding filename extension to input to the filter that is then classified by the filter.

At block 505, the filter determines whether the files are classified as textual. The classification can be according to a numerical output of the filter corresponding to a probability value that the image data is textual. For instance, if the probability value is above a threshold value (e.g., 0.8) then the files are classified as textual and otherwise the image data is classified as non-textual. This threshold value can be determined during training of the filter to minimize FNR and/or FPR. If the files are classified as textual, flow proceeds to block 507. Otherwise, the filter filters the files from further analysis (e.g., applying OCR) and the operations in FIG. 5 along the first flow are complete.

At block 507, an OCR model detects text in the files with OCR and a text-based pattern recognition security model ("pattern model") analyzes the detected text for potentially sensitive data. The OCR model can be an off-the-shelf OCR model that detects text in images using various pre-processing, text detection, and post-processing steps. The pattern model can then receive detect text (e.g., as a plaintext file) and can analyze the text according to regular expressions and keywords. In some embodiments, the pattern model has weights associated to regular expressions and keywords as well as proximity weights to the keywords (e.g., according to a Levenshtein distance). Text having exact matches or approximate matches above a threshold weight can be classified as potentially sensitive by the pattern model. The pattern model can communicate potentially sensitive text and corresponding image data to a data loss prevention module for remediation of any potential data leaks. Subsequently, the operations in FIG. 5 along the first flow are complete.

In parallel to the operations at blocks 501, 503, 505, and 507, at block 509 an OCR filter evaluator ("evaluator") samples files scanned by the scanner. The rate of subsampling can depend on operational considerations such as available computing resources, desired degree of monitoring for the filter, contextual importance of data loss prevention for corresponding customer data, etc. In a heavily monitored computing environment the evaluator can sample files from the scanner at a rate on the order of 10% whereas in a lightly monitored environment the evaluator can sample files from the scanner at a rate on the order of 0.1% or less.

At block 511, the evaluator receives sampled files 500 and sampled files classifications 502 generated at blocks 509 and 503, respectively. The sampled files classifications 502 comprise textual/non-textual classifications by the filter for image data in the sampled files 500. The operations at block 511 are depicted in greater detail with reference to FIG. 6. The operations in FIG. 5 along the second flow are complete.

FIG. 6 is a flowchart of example operations for evaluating performance of a trained OCR filter. At block 601, an OCR model generates OCR feature values for sampled files and classifies the sampled files based on the generated feature values. The feature values can be generated during OCR and can comprise a number of bounding boxes, a number of words, a number of characters, a pixel width, a pixel height, an average number of characters per bounding box, an average number of words per bounding box, etc. The generated feature values can depend on the OCR model and the various processing steps that it performs for image recognition. The OCR model (or, in some instances, a separate classification component) classifies the files as textual or non-textual based on the generated feature values. For instance, each feature value can have a threshold value such that files with feature values above corresponding thresholds are classified as textual and otherwise the files are classified as non-textual.

At block 603, an OCR filter evaluator ("evaluator") calculates a FPR and a FNR for a trained OCR filter ("filter")

based on sampled files classifications by the OCR model and the filter. The FPR is calculated as the ratio of the number of images from the sampled files classified as textual by the filter and non-textual by the OCR model divided by the number of images classified as non-textual by the filter. The FNR is calculated as the ratio of the number of images from the sampled files classified as non-textual by the filter and textual by the OCR model divided by the number of images classified as textual by the filter.

At block 605, the filter determines whether at least one of the FNR and FPR satisfy the update criteria. For instance, the update criteria can be that one of the FPR and FNR are above corresponding thresholds. In some embodiments, the threshold for the FNR is lower than the threshold for the FPR because it is worse for the filter to filter out images that actually contained text than it is for the filter to include images for OCR analysis that don't contain text. In these embodiments, the update criteria can be just a threshold for the FNR. Other update criteria for other performance metrics besides FPR and FNR such as efficiency and filtering rate can be applied. If the update criteria are satisfied, flow proceeds to block 607. Otherwise, the operations in FIG. 6 are complete.

At block 607, an OCR filter trainer ("trainer") updates the filter. For instance, the trainer can retrain the filter using additional training data collected while the filter was deployed. The trainer can update architecture of the filter (e.g., internal parameters, hyperparameters, etc.) and/or the type of filter. The type of filter and architecture can be updated to reduce FPR and/or FNR. Additionally, thresholds that determine which probability values output are classified and textual vs non-textual can be tuned to reduce FPR and/or FNR. Once updated, the trainer redeploys the filter (or deploys the updated version as a replacement for the current version) for filtering non-textual files. The operations in FIG. 6 are complete.

Variations

Trained and in-training OCR filters are depicted throughout as having CNN architecture and comprising a first component that generates internal representations of image data corresponding to files and a second component that classifies the internal representations as having or not having text. This is for illustrative purposes in computing environments when monitored files contain potentially sensitive customer data. In other computing environments involving public or non-sensitive data, the trained and in-training OCR filters can comprise a single component (e.g., all internal layers of a CNN) that are all updated during training. While operations for scanning and extracting image data from customer files across a data stream are depicted for a trained OCR filter, these operations can occur during training for an in-training OCR filter as internal representations of the scanned files are generated and stored. Any files described herein as having image data can comprise one or more images. For files comprising multiple images, these images can be classified as containing text or not containing text by OCR filters individually as multiple images or concatenated as a single image.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 509 and 511 can be performed in parallel or concurrent to the operations depicted in blocks

503, 505, and 507. With respect to FIG. 5, the operations depicted at blocks 509 and 511 for subsampling image data from files and evaluating performance of a trained OCR filter are not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
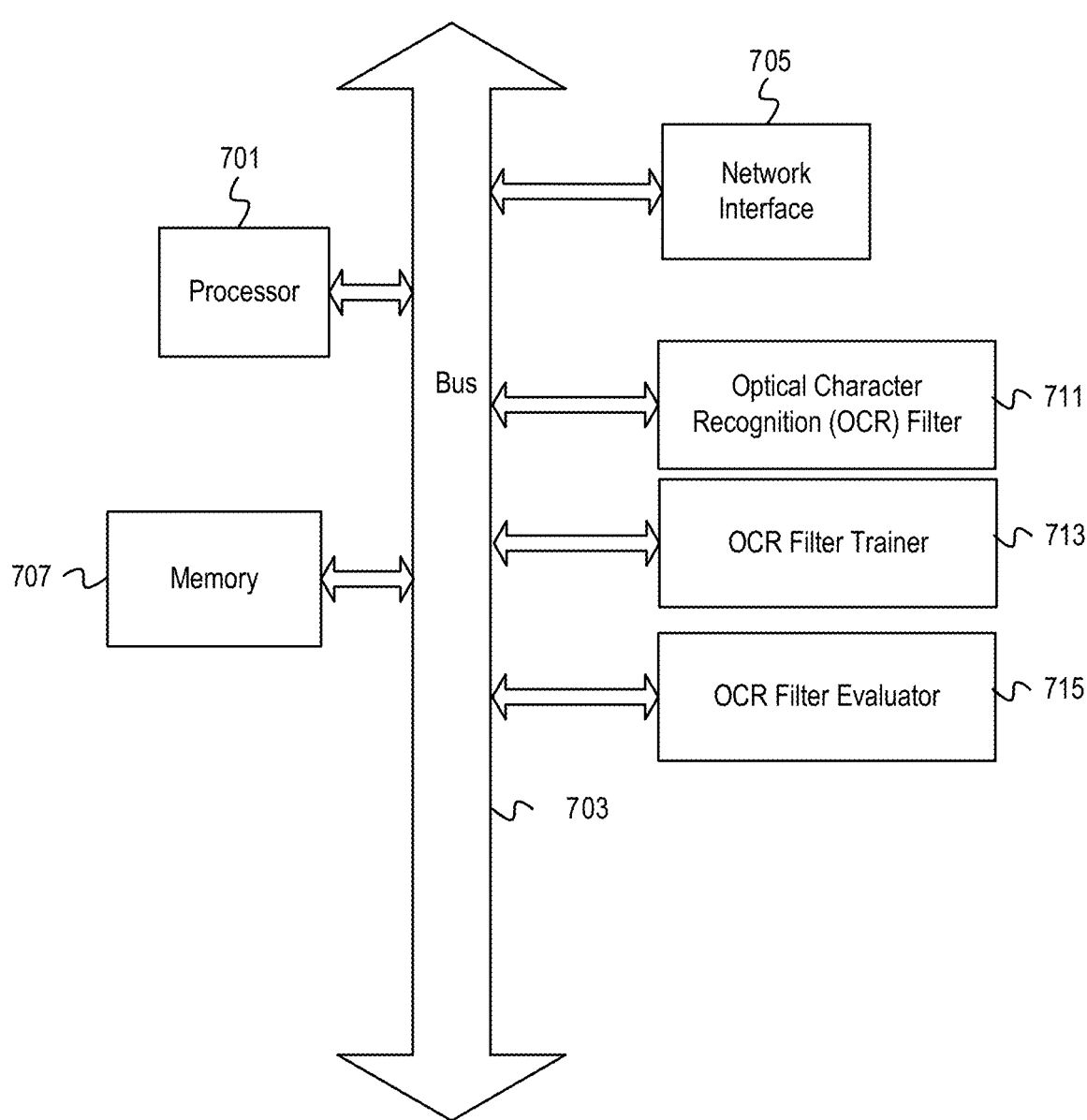
FIG. 7 depicts an example computer system with an OCR filter, an OCR filter trainer, and an OCR filter evaluator.

FIG. 7 depicts an example computer system with an OCR filter, an OCR filter trainer, and an OCR filter evaluator. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes an OCR filter 711, and OCR filter trainer 713, and an OCR filter evaluator 715. The OCR filter 711 filter can filter files intercepted by a data scanner that comprise image data without text to reduce subsequent operations for OCR of potentially sensitive text in the intercepted files. The OCR filter trainer 713 can generate labels for training data by applying OCR to training files by generating feature values for OCR features and applying criteria to the feature values for each training file to determine a label indicating whether the training files comprise text. The OCR filter trainer 713 can then train the OCR filter 711 on the labelled training files. The OCR filter evaluator 715 can continuously evaluate FPR and FNR for the OCR filter 711 by subsampling scanned files and applying OCR to the sampled files to determine whether the OCR filter 711 need to be replaced/updated. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for labelling files according to whether the files comprise image data containing text using feature values generated by applying OCR, training an OCR filter to filter files comprising image data not containing text, and evaluating performance of the trained OCR filter by subsampling and applying OCR to sampled files as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

The invention claimed is:

1. An apparatus comprising:
a processor; and
a non-transitory computer-readable medium having instructions stored thereon that are executable by the processor to cause the apparatus to,
determine labels for a plurality of training files comprising image data indicating whether image data for each of the plurality of training files comprises text based, at least in part, on corresponding feature values for optical recognition features;
input the plurality of training files into a first component of a machine learning model;
store representations of the plurality of training files output by the first component of the machine learning model in secure storage for training;
discard the plurality of training files; and
train a second component of the machine learning model on the stored representations of the plurality of training files and corresponding labels.

2. The apparatus of claim 1, wherein the machine learning model comprises a convolutional neural network (CNN), wherein the first component comprises a first set of one or more internal layers of the CNN, wherein the second component comprises a second set of one or more internal layers of the CNN.

3. The apparatus of claim 2, wherein the first set of one or more internal layers comprises at least a convolutional layer, wherein the second set of one or more internal layers comprises at least a flattening layer and an activation layer.

4. The apparatus of claim 1, wherein the instructions executable by the processor to cause the apparatus to determine labels for the plurality of training files comprise instructions to determine whether the feature values for optical recognition features are below corresponding threshold values.

5. The apparatus of claim 1, wherein the optical recognition features comprise at least one of a number of bounding boxes, a number of words, a number of characters, a pixel width, and a pixel height of corresponding image data.

6. The apparatus of claim 1, wherein the computer-readable medium further has stored thereon instructions executable by the processor to cause the apparatus to evaluate the machine learning model on additional files for at least one of false positive rate and false negative rate.

7. The apparatus of claim 1, wherein the instructions to train the second component of the machine learning model comprise instructions executable by the processor to cause the apparatus to train the second component of the machine learning model to filter representations of files comprising non-textual image data.

8. A non-transitory machine-readable medium having program code stored thereon, the program code comprising instructions to:
determine labels for a plurality of training files comprising image data indicating whether image data for each of the plurality of training files comprises text based, at least in part, on corresponding feature values for optical recognition features;
input the plurality of training files into a first component of a machine learning model;
store representations of the plurality of training files output by the first component of the machine learning model in secure storage for training;
discard the plurality of training files; and
train a second component of the machine learning model on the stored representations of the plurality of training files and corresponding labels.

9. The non-transitory machine-readable medium of claim 8, wherein the machine learning model comprises a convolutional neural network (CNN), wherein the first component comprises a first set of one or more internal layers of the CNN, wherein the second component comprises a second set of one or more internal layers of the CNN.

10. The non-transitory machine-readable medium of claim 9, wherein the first set of one or more internal layers comprises at least a convolutional layer, wherein the second set of one or more internal layers comprises at least a flattening layer and an activation layer.

11. The non-transitory machine-readable medium of claim 8, wherein the instructions to determine labels for the plurality of training files comprise instructions to determine whether the feature values for optical recognition features are below corresponding threshold values.

12. The non-transitory machine-readable medium of claim 8, wherein the optical recognition features comprise at least one of a number of bounding boxes, a number of words, a number of characters, a pixel width, and a pixel height of corresponding image data.

13. The non-transitory machine-readable medium of claim 8, wherein the program code further comprises instructions to evaluate the machine learning model on additional files for at least one of false positive rate and false negative rate.

14. The non-transitory machine-readable medium of claim 8, wherein the instructions to train the second component of the machine learning model comprise instructions to train the second component of the machine learning model to filter representations of files comprising non-textual image data.

15. A method comprising:

determining labels for a plurality of training files comprising image data indicating whether image data for each of the plurality of training files comprises text based, at least in part, on corresponding feature values for optical recognition features;

inputting the plurality of training files into a first component of a machine learning model;

storing representations of the plurality of training files output by the first component of the machine learning model in secure storage for training;

discarding the plurality of training files; and training a second component of the machine learning model on the stored representations of the plurality of training files and corresponding labels.

16. The method of claim 15, wherein the machine learning model comprises a convolutional neural network (CNN), wherein the first component comprises a first set of one or more internal layers of the CNN, wherein the second component comprises a second set of one or more internal layers of the CNN.

17. The method of claim 16, wherein the first set of one or more internal layers comprises at least a convolutional layer, wherein the second set of one or more internal layers comprises at least a flattening layer and an activation layer.

18. The method of claim 15, wherein determining labels for the plurality of training files comprises determining whether the feature values for optical recognition features are below corresponding threshold values.

19. The method of claim 15, wherein the optical recognition features comprise at least one of a number of bounding boxes, a number of words, a number of characters, a pixel width, and a pixel height of corresponding image data.

20. The method of claim 15, further comprising evaluating the machine learning model on additional files for at least one of false positive rate and false negative rate.

* * * * *